United States Patent
Schreyer et al.

(10) Patent No.: US 9,183,664 B2
(45) Date of Patent: Nov. 10, 2015

(54) TILED FORWARD SHADING WITH IMPROVED DEPTH FILTERING

(75) Inventors: Richard W. Schreyer, Scotts Valley, CA (US); Alexander K. Kan, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 603 days.

(21) Appl. No.: 13/462,921

(22) Filed: May 3, 2012

(65) Prior Publication Data

US 2013/0293544 A1    Nov. 7, 2013

(51) Int. Cl.
    *G06T 15/50*    (2011.01)
    *G06T 15/60*    (2006.01)
    *G06T 15/10*    (2011.01)
    *G06T 15/20*    (2011.01)
    *G06T 15/00*    (2011.01)

(52) U.S. Cl.
    CPC .................... *G06T 15/005* (2013.01)

(58) Field of Classification Search
    CPC .................................................. G06T 15/005
    See application file for complete search history.

(56) References Cited

U.S. PATENT DOCUMENTS

| | | | |
|---|---|---|---|
| 7,301,537 B2 | 11/2007 | Strom et al. | |
| 2005/0134588 A1 | 6/2005 | Aila et al. | |
| 2009/0096803 A1* | 4/2009 | Tartaglia et al. | 345/589 |
| 2010/0207943 A1 | 8/2010 | Novosad et al. | |
| 2010/0295853 A1* | 11/2010 | Diamand | 345/426 |
| 2013/0069943 A1* | 3/2013 | Kallio et al. | 345/420 |

OTHER PUBLICATIONS

Olsson, Erik; "Mobile Phone 3D Games with OpenGL ES 2.0;" Master of Science Thesis, Stockholm, Sweden, School of Computer Science and Engineering, Royal Institute of Technology, 2008, ISSN-1653-5715, retrieved from <http://www.nada.kth.se/utbildning/grukth/exjobb/rapportlistor/2008/rapporter08/olsson_erik_08025.pdf> on Jul. 1, 2013; Title pages and pp. 1-46.

Ferrier, Alex; Coffin, Christina; "Deferred Shading Techniques using Frostbite in 'Battlefield 3' and 'Need for Speed The Run';" SIGGRAPH 2011, Vancouver, British Columbia, Aug. 7-11, 2011, ISBN: 978-1-4503-0921-9/11/0008; p. 1.

* cited by examiner

*Primary Examiner* — Kee M Tung
*Assistant Examiner* — Frank Chen
(74) *Attorney, Agent, or Firm* — Meyertons, Hood, Kivlin, Kowert & Goetzel, P.C.; Jeffrey C. Hood (57) ABSTRACT

An image may be divided into tiles, each tile including a multitude of pixels. For each tile, a list of primitive groups that intersect the tile and an initial list of volumes that intersect the tile may be generated. For each primitive group in the list of primitive groups, a per-primitive group list of volumes may be generated. The per-primitive-group list of volumes may include volumes from the initial list of volumes whose depth range overlaps with a depth range of the primitive group. Pixels in the tile which intersect the primitive group may be shaded using the per-primitive-group list of volumes.

25 Claims, 6 Drawing Sheets

TILED FORWARD SHADING WITH IMPROVED DEPTH FILTERING

FIELD

The present embodiments relate to the field of computer graphics, and more particularly to tiled forward shading with improved depth filtering.

DESCRIPTION OF THE RELATED ART

Many modern devices include high end graphical processing systems for presenting graphics on a display. One increasingly important area of graphics processing involves three-dimensional graphics rendering. Rendering a three-dimensional scene into a two-dimensional image for display is a complicated task, typically including a number of steps. In many graphical processing systems, one of the steps in rendering a three-dimensional scene as a two-dimensional image is pixel shading. Pixel shading typically involves applying lights and/or other volume effects to objects in a scene in order to (partially or entirely) determine characteristics of pixels of the scene.

Various pixel shading techniques exist, including forward shading and deferred shading. Each technique has advantages and disadvantages. For example, forward renderers often require a great many shaders, as it may be desirable to be able to apply a variety of types/amounts of light to each possible material; deferred renderers may typically use fewer shaders by separating description of a surface from application of a light to a surface. Forward rendering may also typically shade many more pixels (e.g., unnecessarily) than deferred rendering, as many calculations may be performed even on pixels that will be overwritten later in the scene. However, deferred renderers require a large "G-Buffer" to store intermediate data relating to pixels; in addition, deferred shading doesn't work easily with multi-sample anti-aliasing, and doesn't handle transparent objects well. Other relative advantages and disadvantages of these techniques are also known to skilled practitioners, requiring developers of graphical software applications to make trade-offs in the design process based on the limitations of the existing techniques. Improvements in the field would accordingly be desirable.

SUMMARY

Various embodiments are presented of a system and method for tiled forward shading with improved depth filtering.

An initial aspect of the system and method, in some embodiments, may include tiling the image, e.g., dividing an image into subsets ("tiles"). This may allow certain global scene characteristics to be filtered out, effectively allowing the system to treat each tile as an independent smaller image, at least in some respects. For example, object (or primitive) and volume lists may be created for a tile, which exclude objects and volumes that do not intersect the tile.

A further aspect of the system and method may include performing further filtering of the volume lists based on depth ranges of groups of objects (or primitives) in the tile. Thus, for different groups of objects, specialized lists of volumes may be created which are each tailored to a particular group of objects by including only volumes which meet the particular volume (e.g., height, width, and depth) characteristics of the particular group of objects.

Since a tile may typically include object groups at multiple, discontinuous depth ranges, creating smaller, depth-specific volume lists for each object group may avoid a significant amount of computation that would otherwise be involved in pixel shading. Numerous other advantages and benefits may also be obtained by use of embodiments of the system and method described herein, as will be apparent to those skilled in the art in light of this disclosure.

According to one set of embodiments, a computer-implemented method is presented for rendering a three-dimensional scene as a two-dimensional image. The three-dimensional scene may include a multitude of objects and a multitude of volumes. The two-dimensional image may include a multitude of pixels. The method may be performed as follows.

The image may be divided into multiple tiles. Each tile may include a subset of the multitude of pixels. For each respective tile, an initial list of volumes that intersect the tile may be generated. A first depth range may also be determined for a first set of objects that intersect the tile. A first list of volumes may be generated for the first set of objects. The multitude of volumes may be filtered based on the first depth range to generate the first list of volumes. In some embodiments, the first list of volumes be selected from the initial list of volumes; for example, generating the first list of volumes may include selecting volumes whose depth ranges overlap with the first depth range from the initial list of volumes that intersect the tile.

Pixels in the tile may be shaded based on the first list of volumes. In some embodiments, shading a pixel based on the first list of volumes may include iterating over each volume in the first list of volumes to determine characteristics of the pixel based on effects of each volume on the pixel. For example, shading a pixel based on the first list of volumes may be based on effects of each volume in the first list of volumes on one or more objects that intersect the pixel.

Each shaded pixel may be stored in a frame buffer. Storing each shaded pixel in the frame buffer may include storing information identifying the determined characteristics of the pixel in the frame buffer. For example, the determined characteristics could include color characteristics, texture characteristics, or other pixel characteristics. Storing each shaded pixel in the frame buffer may further include blending the characteristics of the pixel determined based on effects of each volume in the first list of volumes on the pixel with previously determined characteristics of the pixel.

Some embodiments may further include determining a second depth range for a second set of objects that intersect the tile. A second list of volumes may also be generated in this case. The second list of volumes may include a subset of the multitude of volumes that is filtered based on the second depth range; for example, generating the second list of volumes may include selecting volumes whose depth ranges overlap with the second depth range from the initial list of volumes that intersect the tile. Pixels in the tile may further be shaded based on the second list of volumes. The first depth range and the second depth range may be discontinuous in some embodiments. Similar steps may be taken to shade pixels in the tile based on any number of additional sets of objects that intersect the tile, in various embodiments.

The multitude of volumes may include one or more light volumes, decal volumes, and/or other types of volumes, in various embodiments.

Further embodiments are directed towards a computer system configured to render a three-dimensional scene as a two-dimensional image. The computer system may include a central processing unit (CPU), a graphics processing unit (GPU); and a non-transitory computer-accessible memory medium, wherein the memory medium includes program instructions executable by the CPU and/or the GPU to perform embodiments of the method described above. Thus, the computer system may be configured to divide the image into multiple tiles, each tile including a subset of the multitude of pixels. The computer system may further be configured to generate an initial list of volumes that intersect each tile. In some embodiments, the GPU may include hardware (e.g., hardware logic) configured to divide the image into the multiple tiles and generate the initial list of volumes that intersect the tile for each respective tile.

Furthermore, for each of one or more sets of objects that intersect the tile, the computer system may be configured to determine a depth range for the set of objects, generate a list of volumes for the set of objects based on the initial list of volumes that intersect the tile and the depth range for the set of objects, shade pixels that intersect the set of objects based on the list of volumes for the set of objects, and store each shaded pixel in a frame buffer.

In some embodiments, generating the list of volumes for each respective set of objects may include comparing bounds of each volume in the initial list of volumes that intersect the tile with a bounding volume of the respective set of objects. The list of volumes for each respective set of objects may include volumes whose bounds intersect the bounding volume of the respective set of objects. In some embodiments, the program instructions may be executable to perform a hardware call to the GPU to generate the list of volumes for each respective set of objects. The GPU may be configured to simultaneously compare bounds of a multitude of volumes with the bounding volume of the respective set of objects in response to the hardware call.

Embodiments are also directed to a non-transitory computer-accessible memory medium. The memory medium may include program instructions for generating a two-dimensional image of a three-dimensional scene, such as according to embodiments of the method described above. The program instructions may be executable by a CPU and/or a GPU. For example, the program instructions may be executable to divide the image into multiple tiles, each tile being a subset of the image, and having a multitude of pixels. For each respective tile, the program instructions may be executable to determine a first depth range for a first set of objects that intersect the tile, generate a first list of volumes that intersect the tile within the first depth range, and shade pixels which intersect the first set of objects based on the first list of volumes.

In some embodiments, in order to shade the pixels which intersect the first set of objects based on the first list of volumes, the program instructions may be further executable to calculate interactions or effects of volumes in the first list of volumes on objects in the first set of objects to generate characteristics of pixels intersecting objects in the first set of objects.

In some embodiments, the program instructions may be further executable to write pixel data to a frame buffer based on the generated characteristics of pixels intersecting objects in the first set of objects. Writing pixel data to the frame buffer may include blending the generated characteristics of pixels with previously determined characteristics of the pixels. Alternatively, writing pixel data to the frame buffer may include overwriting previously determined characteristics of the pixels with the generated characteristics of pixels. The decision of whether to blend or overwrite the generated characteristics may depend on the opacity or transparency of the objects of in the first set of objects which the pixel(s) intersect.

In some embodiments, the program instructions may be further executable to perform similar steps for each of any number of additional sets of objects that intersect the tile. For example, a respective depth range of each respective set of objects that intersect the tile may be determined; a respective list of volumes that intersect the tile within the determined depth range of the respective set of objects may be generated; and pixels which intersect the respective set of objects based on the respective list of volumes may be shaded.

Additional embodiments relate to a computer implemented method for rendering a three-dimensional scene as a two-dimensional image. The three-dimensional scene may include a multitude of objects lit by a multitude of light volumes, and the two-dimensional image may include a multitude of pixels.

The image may be divided into multiple tiles. Each tile may include a subset of the multitude of pixels. For each respective tile, a list of primitive groups that intersect the tile may be generated, as well as an initial list of lights that intersect the tile.

For each primitive group in the list of primitive groups that intersect the tile, a per-primitive-group list of lights may be generated, and pixels in the tile which intersect the primitive group may be shaded using the per-primitive-group list of lights. The per-primitive-group list of lights may include lights whose depth range overlaps with a depth range of the primitive group.

In some embodiments, generating the per-primitive group list of lights may include comparing bounding volumes of lights in the initial list of lights that intersect the tile with a primitive group bounding volume. Dimensions of the primitive group bounding volume may be based on minimum and maximum height, width, and depth dimensions of the primitive group (or a subset of the primitive group, such as those primitives in the primitive group which are visible). The per-primitive group list of lights may include lights whose bounding volumes intersect the primitive group bounding volume.

In some embodiments, the list of primitive groups that intersect the tile may be a subset of all the primitive groups that intersect the tile. For example, primitive groups which intersect the tile but which are entirely obscured may be excluded or discarded in order to save computational expense.

In some embodiments, shading the pixels in the tile which intersect the primitive group may include generating pixel data based on characteristics of and interactions between primitives in the primitive group and lights in the per-primitive group list of lights. The generated pixel data may be stored in a frame buffer.

A still further set of embodiments relates to a computer-implemented method for rendering a three-dimensional scene as a two-dimensional image which utilizes improved depth filtering but which may not rely on tiling. The three-dimensional scene may include a multitude of objects and a multitude of volumes, and the two dimensional image may include a multitude of pixels for which pixel data is stored in a frame buffer.

The scene may include multiple sets of objects. For each set of objects, the following steps may be performed: a bounding box for the set of objects may be determined based on minimum and maximum dimensions in height, width, and depth of the set of objects; volume bounds of at least a subset of the multitude of volumes may be compared with the bounding box for the set of objects; and a list of volumes that intersect the first set of objects may be generated based on the comparison(s).

Additionally, for each respective pixel intersecting a set of objects, effects of each volume in the list of volumes on the pixel may be calculated, and the calculated effects may be blended with pre-existing pixel data for the respective pixel to generate new pixel data for the respective pixel. The new pixel data may be stored in the frame buffer.

It should be noted that while the above summary delineates several sets of embodiments, according to at least some embodiments, steps or components described with respect to one set of embodiments may equally well be included as part of any or all of the other sets of embodiments.

BRIEF DESCRIPTION OF THE DRAWINGS

A better understanding of the present embodiments can be obtained when the following detailed description of the preferred embodiment is considered in conjunction with the following drawings, in which.

While embodiments described herein susceptible to various modifications and alternative forms, specific embodiments thereof are shown by way of example in the drawings and are herein described in detail. It should be understood, however, that the drawings and detailed description thereto are not intended to limit the embodiments to the particular form disclosed, but on the contrary, the intention is to cover all modifications, equivalents and alternatives falling within the spirit and scope of the present embodiments as defined by the appended claims.

DETAILED DESCRIPTION OF THE EMBODIMENTS

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIGS. 1A-1D—Exemplary Systems

FIGS. 1A-1D illustrate a variety of types of computer systems which may be configured to implement embodiments of this disclosure. As shown, the computer system may be a desktop (such as desktop 100 shown in FIG. 1A), smart phone (such as smart phone 125 shown in FIG. 1B), tablet (such as tablet 150 shown in FIG. 1C), or a laptop (such as laptop 175 shown in FIG. 1D). Embodiments of the disclosure may also or alternatively be implemented by other types of devices according to some embodiments, including but not limited to: server computer systems; gaming consoles (including handheld gaming consoles); televisions; portable media players; or any of various other types of devices (which may also be computer systems) which may be configured to generate and/or display two-dimensional renderings of three-dimensional scenes. For simplicity's sake, embodiments of the disclosure will henceforth be described primarily with respect to implementation by a computer system.

The computer system configured to implement embodiments of this disclosure may include a display, which may be operable to display graphics provided by an application executing partially or entirely on the computer system (and/or executing partially or entirely on another computer system). Alternatively (or in addition), the computer system may execute an application configured to generate graphics for display on another computer system or device. For example, according to some embodiments, a first computer system may execute and provide an application including graphics for display at a second computer system over a network, such as a local area network (LAN) or a wide area network (WAN), such as the internet. The application may be any of various applications, such as, for example, games, media playback applications, internet browsing applications, email applications, phone applications, productivity applications, etc.

The computer system 100 may include one or more memory medium (media) on which one or more computer programs or software components may be stored. For example, an application, graphics framework software, and/or graphics driver software configured to generate graphics for display, may be stored in a memory medium. The application, graphics framework software, and/or the graphics driver software may be executable to perform (e.g., independently or in combination) at least a portion of the methods described herein. The memory media may also store operating system software, as well as other software for operation of the computer system. Various embodiments further include receiving or storing instructions and/or data implemented in accordance with the foregoing description upon a carrier medium.

The computer system may include a central processing unit (CPU) and a graphics processing unit (GPU) which may collectively execute the application. For example, the CPU may generally execute the application as well as a graphics framework (e.g., OpenGL, DirectX, etc.) and the graphics driver may handle any graphics calls or commands that are provided by the application during execution. The graphics driver may in turn provide GPU commands to the GPU, which may execute these commands to provide display capabilities for the application. As used herein, a "graphics application" refers to an application which provides graphics commands for displaying graphics of the application on a display. In other words, the term "graphics application" refers to a software application that, when executed, causes the display of various graphics on a display, e.g., via graphics commands.

Figure 1A:
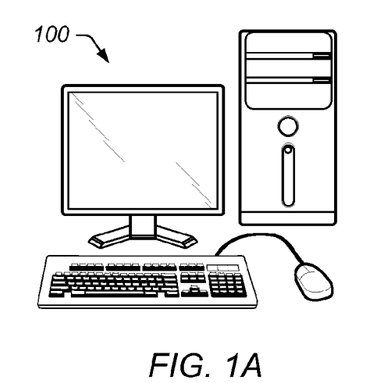
FIGS. 1A-1D illustrate various systems for implementing various embodiments.
Figure 1B:
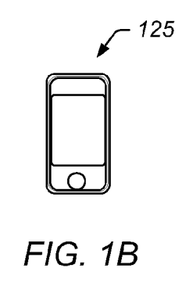
Figure 1C:
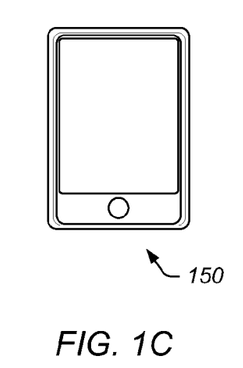
Figure 1D:
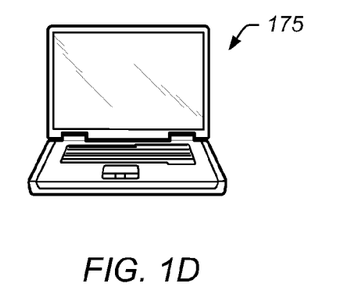
Figure 2A:
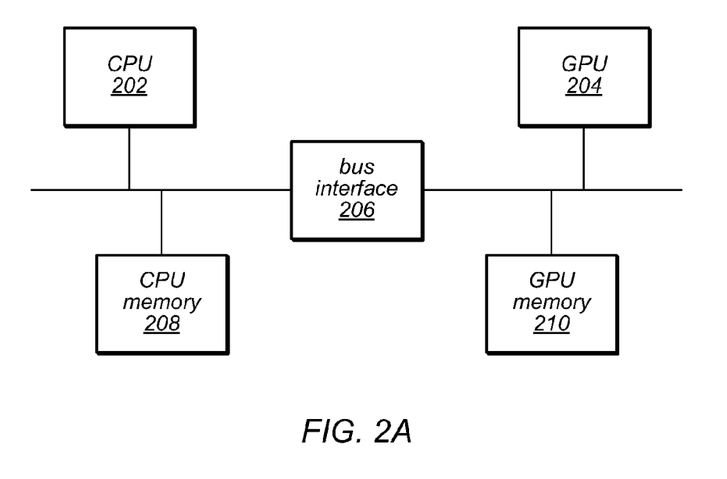
FIGS. 2A and 2B are block diagrams of a system including a CPU and a GPU, according to some embodiments.
Figure 2B:
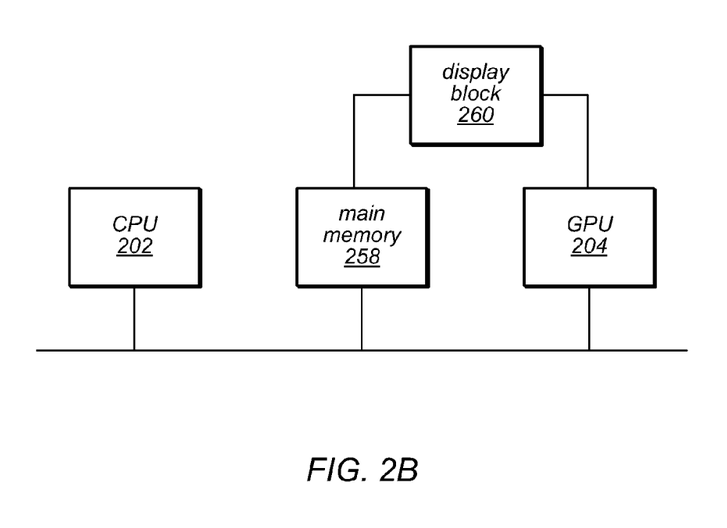

FIGS. 2A-2B—Exemplary Block Diagrams of Graphics System Hardware

FIGS. 2A and 2B are block diagrams of embodiments of device hardware implementing a graphics system. It is noted that FIGS. 2A and 2B are simplified block diagrams, where various components that would normally be present, but which are not necessary for an understanding of the present embodiments, are omitted for simplicity and clarity.

More specifically, FIG. 2A illustrates one embodiment of a hardware architecture of a computer system, such as 100, 125, 150, or 175. As shown, the CPU 202 and CPU memory 208 may be coupled together (e.g., over a system bus) and GPU 204 and GPU memory 210 may also be coupled together. The CPU 202 and GPU 204 (and their corresponding memories) may be coupled via bus interface 206. For example, in one embodiment, the GPU 204 and GPU memory 210 may be implemented as a video system having a different system interface than the CPU 202 and CPU memory 208. For example, the GPU 204 and GPU memory 210 may be implemented as a video card that is plugged in to a slot of the computer system 100 or 190. The video card may be implemented as a PCI, PCIe, AGP, etc. card. Accordingly, bus interface 206 may interface with the system bus of the CPU 202 and the bus of the video card. The computer system, 100, 125, 150, or 175 may also include display logic (not shown) as well as various other logic.

FIG. 2B illustrates an alternative embodiment of a hardware architecture that may be implemented by computer system 100, 125, 150 or 175. In this architecture, the CPU 202 and GPU 204 may be coupled over a system bus and may share a common or unified memory 258 (although separate memories are envisioned). Additionally, a display block 260 may be coupled to memory 258 and GPU 204 for displaying various images on the display of the computer system 100, 125, 150 or 175. This implementation may apply to devices whose internal hardware are all or mostly provided within a single integrated chip, e.g., as a system on a chip (SOC).

It should be noted that the above hardware architectures of the graphics system are exemplary and are provided for illustration purposes only. Thus, various modifications (e.g., of blocks or connectivity) resulting in different hardware architectures are envisioned.

Figure 3:
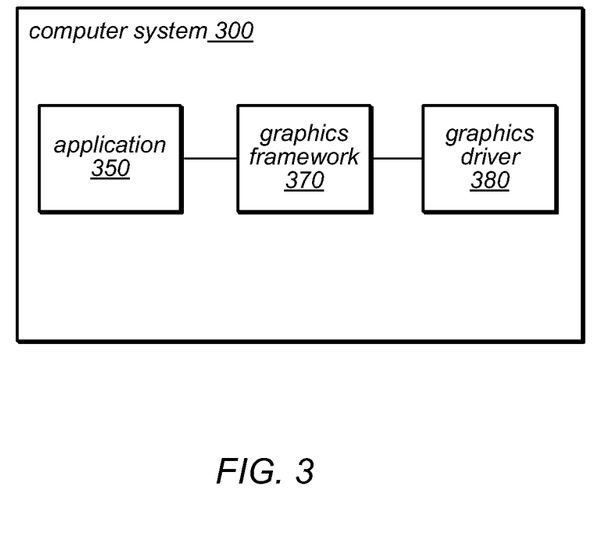
FIG. 3 is a block diagram of one possible software architecture of a computer system according to one embodiment.

FIG. 3—Exemplary Block Diagram of Software Architecture

FIG. 3 is a block diagram of one embodiment of a software architecture that may be utilized in conjunction with various embodiments described herein. The software architecture shown in FIG. 3 may be implemented in a computer system 300, such as any of computer system 100, 125, 150, or 175 illustrated in FIGS. 1A-1D, and may include a hardware architecture such as illustrated in FIGS. 2A-2B, among other possible types of computer systems and hardware architectures.

As shown in FIG. 3, the computer system 300 may execute a variety of programs, including application 350, graphics framework 370, and graphics driver 380. While this diagram largely shows programs that are executed by the CPU of the computer system 300, note that the GPU of the computer system 300 may also execute programs, e.g., shaders, that may be provided by the application 350.

The application 350 may be a graphics application. In some embodiments, the application 350 may be an application which utilizes real-time rendering of three-dimensional scenes, such as a 3-D gaming application. Other types of applications are also possible.

The graphics framework 370 may be any of various types of graphics frameworks, e.g., various versions of openGL (including openGL for embedded systems (ES)), DirectX, etc. The graphics framework 370 may receive API calls from the application 350 for performing graphics framework functions. In turn, the graphics framework 370 may provide commands to the graphics driver 380. Finally, the graphics driver 380 may provide GPU commands to the GPU. The CPU executing the graphics framework 370 and the graphics driver 380, along with the GPU may form a graphics pipeline, such as those embodiments described in FIGS. 4A and 4B below.

Note that the above software architecture is exemplary only and other variations and modifications are envisioned. For example, in some embodiments, the graphics framework 370 may not be necessary and/or may be implemented as part of the application 350 rather than being a separate executable.

Figure 4A:
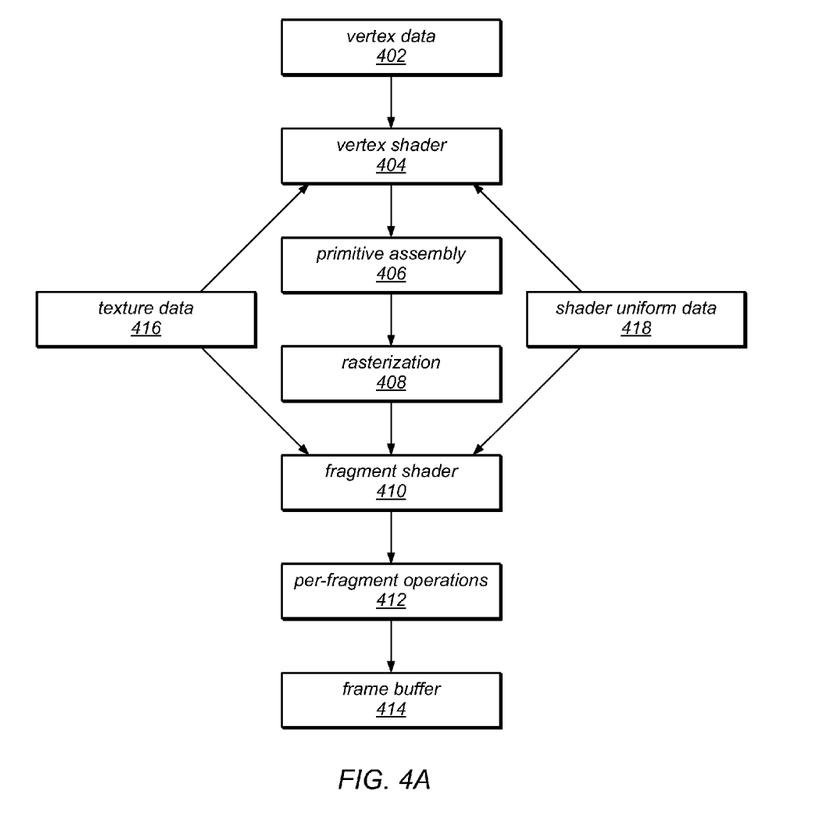
FIGS. 4A-B are exemplary block diagrams illustrating embodiments of a graphics pipeline.
Figure 4B:
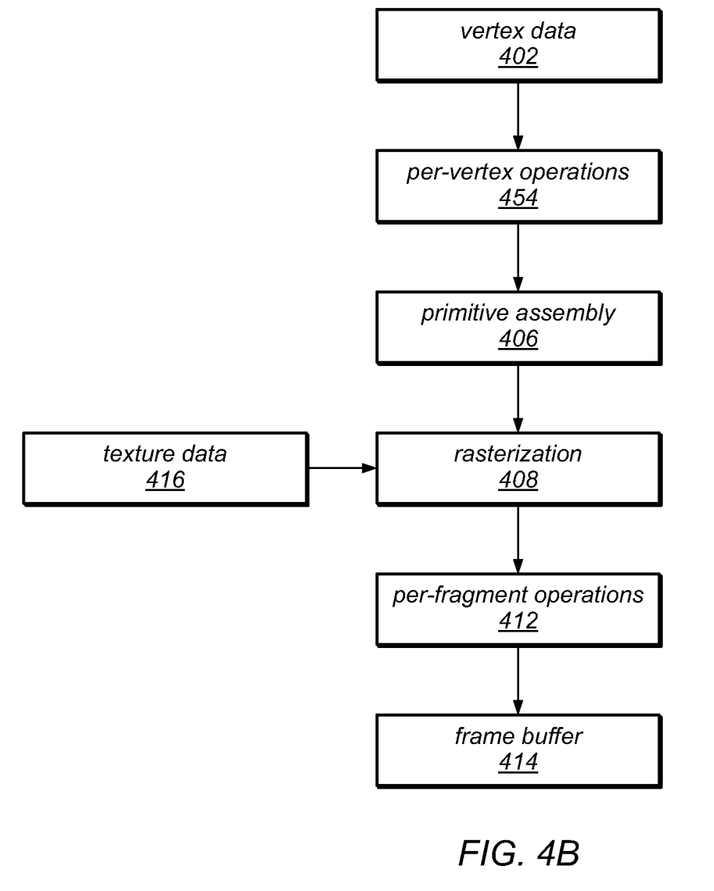

FIGS. 4A and 4B—Exemplary Graphics Pipeline

FIGS. 4A and 4B illustrate exemplary graphics pipelines. More particularly, FIG. 4A illustrates an OpenGL embedded system (ES) 2.0 pipeline and FIG. 4B illustrates an OpenGL embedded systems (ES) 1.1 pipeline, e.g., which may be suitable for mobile computer systems such as smart phone 125 or tablet 150. However, the pipelines of FIGS. 4A and 4B may also be implemented on a computer system such as desktop 100 or laptop 175, e.g., with further modifications. For example, a typical OpenGL pipeline may be used for the desktop computer system 100 (rather than an ES pipeline). The pipelines of FIGS. 4A and 4B may be implemented using the graphics system of FIG. 2A or 2B and may also interact with the software architecture of FIG. 3. For example, the pipeline of FIGS. 4A and 4B may be implemented as software processes executing on the CPU and/or GPU. Note that the GPU may execute various software on the GPU to perform portions of the graphics pipeline and/or may include dedicated hardware for performing those portions, as desired.

In the graphics pipeline of FIG. 4A, the pipeline may begin with vertex data in 402. The vertex data may specify the vertices of the graphics data to be rendered. In one embodiment, the vertex data may include data about polygons with vertices, edges and faces that constitute an entire scene.

In 404, the vertex data of 402 may be processed by a vertex shader. More particularly, the vertex shader may be run for each vertex, e.g., by the GPU. This process may transform each vertex's 3D position in virtual space to the 2D coordinate at which it will appear on the display. The vertex shader may manipulate various properties, including position, color, texture coordinate, etc. As shown, the vertex shader 404 may be informed by texture data 416 and/or shader uniform data 418.

In 406, primitives may be assembled from the vertices output from 404. For example, in this stage vertices may be collected and converted into geometric shapes, e.g., triangles.

In 408, the primitives may be used in rasterization. More particularly, the primitives from 406 may be filled with pixels or fragments.

In 410, the fragment shader (or pixel shader) (e.g., executed by the GPU) may add textures and final colors to the fragments (e.g., pixels). Fragment shaders may typically take into account scene lighting and related effects, such as bump mapping and color toning. As shown, the fragment shader may be informed by texture data 416 and shader uniform data 418.

In 412, various per-fragment operations may be performed. For example, the operations may combine the final fragment color, its coverage, and/or degree of transparency with the existing data stored at the associated 2D location in the frame buffer to produce the final color for the pixel to be stored at that location.

In 414, the data may be stored in physical memory which holds the actual pixel values displayed on the screen. The frame buffer memory may also store graphics commands, textures, and/or other attributes associated with each pixel. This data may be used to output the final image to the display.

FIG. 4B illustrates an abbreviated pipeline that may be more appropriate for embedded systems. As shown, is the pipeline includes vertex data 402, per-vertex operations 454 (similar to vertex shader 404), primitive assembly 406, rasterization 408, per-fragment operation 412, and frame buffer 414. This pipeline does not utilize the fragment shader 410 or the shader uniform data 418. Additionally, the texture data is only utilized by rasterization 408 rather than by shaders, as in FIG. 4A.

Thus, FIGS. 4A and 4B illustrate exemplary graphics pipelines. It should be noted, however, that different graphics pipelines are also possible and may be used to implement embodiments of this disclosure, as desired. For example, various embodiments of the disclosure relate to techniques for tiled forward shading with improved depth filtering, which may be implemented to apply lighting and other volume effects in a scene as part of any number of graphics pipelines.

The following discussion relates to application of lights to surfaces (e.g., of objects) in a three-dimensional scene according to various types of 3-D graphics rendering pipelines.

Lights are often represented, for 3-D graphical rendering purposes, as volumes. This may be reasonable, as lights may have a natural volume of influence, within which they may affect objects' visible characteristics, such as surface color. For example, a point light might influence objects within a spherical volume, while a spotlight might influence objects within a conical volume. Other types of lights may have different shapes (or other shapes may be used for point lights and/or spotlights), as desired. In some embodiments, light volume shapes may further be affected by opacity of objects within their natural volume, which might deform a portion of a light's natural volume shape (e.g., may create shadows). In other embodiments, opacity of objects may be treated in a different way and may not affect light volume shapes.

The application of a light to a surface may typically be roughly subdivided into two parts: work that is independent of any light, and work that is done per light. The light-independent portion may commonly include computing the normal (which may commonly be further modified by a decal) and material properties (e.g., bidirectional reflectance distribution function (BDRF)), both of which may vary per pixel.

Forward shading is one technique which may be used to calculate lighting effects in a 3-D scene. Most renderers that use forward shading calculate the entire result for a pixel in one invocation of a pixel shader. For each object, the set of lights that may intersect any part of that object are found, and loaded as shader constants. In the shader, there is a loop over every light. Light independent values that are needed to compute the contribution of each light are readily available in registers.

Deferred shading is another technique which may be used to calculate lighting effects in a 3-D scene. In deferred shading, any per-pixel and light-independent values that are needed as inputs into the lighting equations are instead saved into a G-Buffer (geometry buffer), but no lights are applied during this phase. Once all geometry has been written into the G-Buffer, one volume per light is drawn on top of the scene, which reads from the G-Buffer to determine the single visible pixel at each covered location, computes the contribution of that light, and then writes that contribution into the color buffer. The end result is that only the front-most visible pixel is shaded: the cost of occluded pixels is writing to the G-Buffer.

As forward shading and deferred shading represent the two most commonly used and methodologically different techniques for applying lighting in 3-D graphics rendering, it may be valuable to discuss some of the tradeoffs between forward and deferred shading. The following paragraphs describe a number of issues relating to some positive and negative aspects of each technique. It will be recognized that this is not intended to be an exhaustive description, and other issues relating to differences between forward shading and deferred shading also exist.

A first consideration relates to shader permutations. Forward renderers often require a great many shaders, as it may be desirable for every material to be able to apply a diffuse light, a specular light, two diffuse lights and one specular light, etc. Such a combinatorial explosion may result in tens of thousands of shaders being generated, e.g., for modern games. Deferred shading, in contrast, may entirely separate the description of the surface from the lights, and so may result in a significantly reduced shader count, potentially resulting in significant computational and/or memory savings.

A second consideration relates to over-shading. Forward rendering may typically shade many more pixels than deferred shading, as the expensive lighting math is generally performed immediately, even on pixels that may be overwritten later in the scene. Deferred shading may never shade obscured pixels, potentially resulting in further significant computational savings.

A third consideration concerns the number of draw batches, and excessive lighting. For efficiency, it may be desirable to not have the shader compute a light that is so far away that its contribution is 0. For many logical objects in a scene, a light may cover only part of an object, leading to wasted effort on the other part. This may be compensated for by subdividing objects into smaller objects and searching for light/object intersections on a finer granularity, but that requires additional CPU time, and results in smaller draw batches to the GPU, which also takes additional CPU time. Deferred rendering typically allows for very large draw batches to be performed, regardless of which lights apply to those objects (or whatever fractions of those objects), again potentially resulting in computational savings.

A further consideration is the G-Buffer Size. G-Buffers are typically large; many deferred shading implementations store at least 20 bytes per pixel. Even at that size, the amount of data that can be passed via the G-Buffer to the lighting shaders is limited, and many cycles are expended to compress and reformat data to make the most use of those bits as possible. Forward shader implementations typically utilize (many) shader registers that are, computationally, far cheaper to access, potentially providing savings in both memory (e.g., by not using a G-Buffer) and computation (e.g., by not needing to frequently access a G-Buffer).

An additional consideration relates to antialiasing: Deferred Shading doesn't work easily with multi-sample anti-aliasing (MSAA). A brute force solution to store a G-Buffer entry per-sample causes the G-Buffer size to grow vastly larger, and difficulty may arise with the need to avoid over-shading on samples which are not on a polygon edge. Instead, most deferred applications now typically use post-process Anti-Aliasing solutions, which provide somewhat less quality than MSAA, but at a much lower cost. Forward shading, which does work well with MSAA, would seem to have an advantage in this respect, although it should be noted that due to improvements in post-process Anti-Aliasing, it is sometimes used for forward renderers as well.

A still further consideration concerns transparency. Forward rendering doesn't handle transparencies particularly well, but it is capable of providing transparencies, and its problems with this aspect are well understood. Deferred rendering, in contrast, doesn't naturally handle transparencies at all: it stores only one G-Buffer entry per-pixel, and so it will only handle opaque surfaces. Applications are thus typically required to fall back to forward rendering to composite transparencies onto a scene after the deferred work is complete. Alternatively, it would be possible to store multiple G-Buffer entries per pixel, but that would cause a significant increase in the already very large G-Buffer size. Forward shading thus appears to have the advantage in this respect.

Yet another consideration relates to material variety. In forward shading, a user can express wide material variety by loading a different shader: both the light-independent and per-light portions of the shader can be customized to the material. In deferred shading, only one body of code is run in the lighting pass, and it must handle all materials, which limits the number of materials that are efficiently supportable. Recording which material a pixel uses also consumes precious G-Buffer space.

Software simplicity represents an additional concern. A forward renderer requires frequent intersection tests on the CPU between lights and objects, and managing a large number of shaders to handle each kind of intersection with each kind of material, as both objects and lights are created, moved, and destroyed. Deferred shading allows geometry and lights to be drawn entirely independently of each other, resulting in much simpler scene graph traversal. However, in practice, in order to handle transparent content a forward renderer is typically still required, potentially negating the benefits of the software simplicity of deferred shading.

Other techniques may improve on some of the drawbacks of forward and deferred shading. One such technique, Light-Indexed Deferred Rendering (LIDR), typically includes drawing the geometry once to seed a z-buffer, and then drawing light volumes, collecting small per-pixel light indexes (practically limited to 4 lights for each pixel, one for each channel in the 'light' image). Then, the geometry may be drawn again, including reading the light indexes, and using those to look up the description of the light itself.

Tile-based techniques may solve some of the above-described problems. For example, Tile-Based Deferred Shading (TBDS) is a further technique, in which the frame buffer is divided into a number of smaller groups of pixels, often in a grid format. The smaller groups of pixels (which might be 16×16, 32×32, 10×20, or any other dimensions) are typically referred to as tiles. For each tile the application may generate a list of which lights intersect that tile. A compute shader then typically reads an entire tile of the G-Buffer once into local memory, and applies all lights. When many lights cover the same pixels, this avoids redundant reads from the G-Buffer, allowing TBDS to scale to a larger number of lights.

Tile-Based Deferred Rendering (TBDR) is another tile-based technique, which is intended to solve over-shading problems, even in a forward renderer. In TBDR, the image may be divided into tiles. The scene may thus be drawn one tile at a time, which enables the entire tile to be cached on-chip, providing much cheaper access. The rendering may be entirely deferred, rather than just the shading; for example, the chip may keep track of only the primitives that are visible in each pixel, and may run the full shader only after visibility has been resolved. This approach also makes MSAA and transparencies much cheaper as well.

In some embodiments, TBDR techniques may be significantly hardware-based, and may accordingly require GPU designs capable of (and/or specifically designed for) TBDR. However, similar techniques may also be implemented using more generic GPU designs, e.g., with greater reliance on software and CPU use, if desired.

A further refinement of the above described techniques may include a composite technique which utilizes forward rendering techniques (thus having all of the transparency, multisample, and small memory size advantages of a forward renderer), but which also utilizes hardware-based tiling and hidden-surface-removal systems to avoid over-shading. Generally, techniques which utilize tiling in combination with forward rendering techniques (regardless of which aspects are implemented using hardware and which aspects are implemented using software) may be referred to as tiled forward shading.

In one set of embodiments, a tiled forward shading technique may include generating, for each pixel, a list of which lights intersect that pixel, in order to only apply those lights to the pixel. While searching through every light in an entire scene for each pixel may be impractical, according to some embodiments, such a search may be done much more coarsely and yet still effectively. For example, light lists may be generated on a per-frame-buffer-tile basis, such that only one light list may be generated for all of the pixels in a tile.

Additionally, because neighboring pixels from the same primitive typically have very similar light lists (they may almost never diverge), it may be possible to search the per-tile light list once for each group of primitives, to further filter the list of relevant lights by comparing Z (depth). As one example, for each primitive group (e.g., including one or more objects in the scene), a subset of the initial list of lights including only lights that overlap with a depth range of that primitive group might be generated. Lights that pass the Z (depth) test may be stored in a list in a register file. Then, the individual fragment shader instances execute, each iterating over the (filtered in X, Y, and Z) light list.

Such a tiled forward shading technique, with improved depth filtering of lights, may thus provide the benefits in rendering quality (e.g., including improved material selection, transparency, MSAA function, etc.) of forward shading while also providing the software simplicity and computational efficiency of deferred shading, without requiring the trade-off expense of a G-Buffer.

It should be noted that while the above-discussion relates primarily to the application of light volumes to objects in a scene, other "volumes" in addition to or instead of lights may be treated in a similar manner, if desired. For example, decals may be treated as volumes in some implementations. Atmospheric effects, such as fog or mist, may also be treated as volumes in some implementations. Other types of volumes are also possible.

Figure 5:
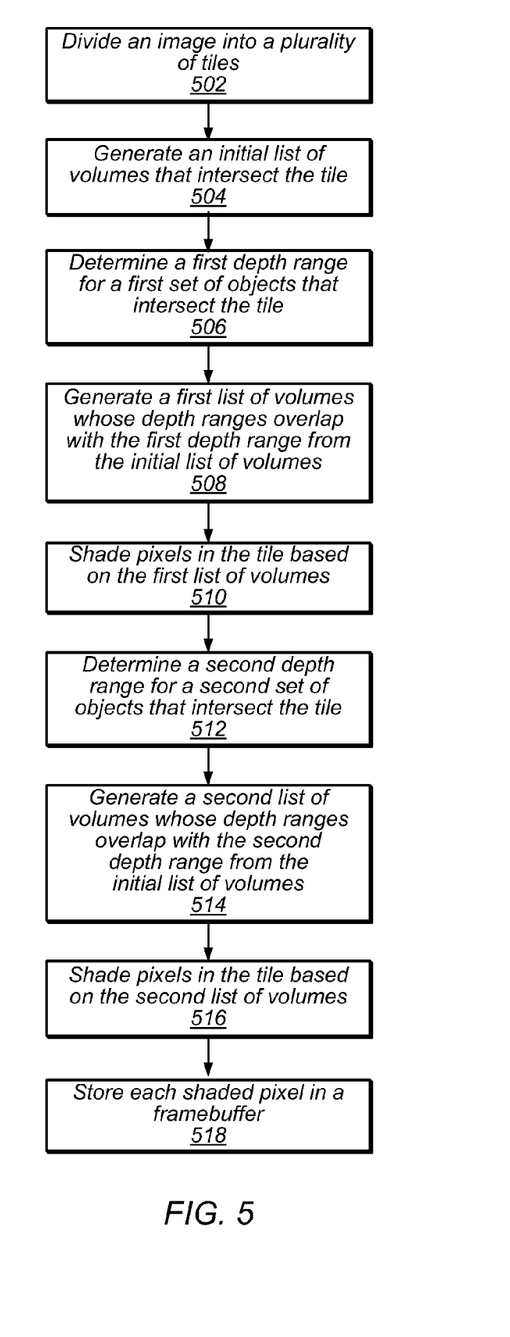
FIG. 5 is a flowchart diagram illustrating one embodiment of a method for tiled forward shading with improved depth filtering.

FIG. 5—Tiled Forward Shading with Improved Depth Filtering

FIG. 5 is a flowchart diagram illustrating a method for tiled forward shading with improved depth filtering, such as outlined above. As described above, many of the significant benefits of the method of FIG. 5 may arise from using a limited selection of volumes (e.g., filtered in X, Y, and Z based on affected pixel(s)) in pixel shading, thereby decreasing the (e.g., primarily computational) costs of forward shading while gaining its (e.g., primarily qualitative) advantages. The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 502, an image may be divided into multiple tiles. The image may be a two-dimensional image including a multitude of pixels. Each tile may include a subset of the multitude of pixels. The two-dimensional image may be used for a rendering in two-dimensions of a three-dimensional scene. The three-dimensional scene may include a multitude of objects and a multitude of volumes. The multitude of volumes may include a multitude of lights, decals, atmospheric effects, and/or other volumes.

In some embodiments, dividing the image into tiles ("tiling the image") may also include determining which geometry (e.g., primitives/primitive groups each having multiple vertices, and representing objects in the scene) intersects each tile.

Furthermore, as described above (e.g., with respect to TBDR), in some embodiments, this 'geometry pass' may also include determining which primitives intersect each pixel. Visibility of primitives that intersect each pixel may also be considered in the geometry pass, if desired. For example, in some embodiments, only those primitives that are visible in a respective pixel may be associated with that pixel. This may be accomplished, if so desired, by determining all of the primitives which intersect the pixel, determining that one or more primitives are entirely obscured by one or more other primitives (e.g., opaque objects), discarding those primitives determined to be invisible or obscured, and associating those primitives that intersect the pixel and which are not obscured with the pixel. In other words, any primitives which intersect the respective pixel but are entirely obscured by one or more opaque objects may be discarded as being invisible. Other means of performing visibility resolution may be used if desired.

Such a step of visibility resolution may also or alternatively be performed independently of the tiling, e.g., at a different time/stage in the process. For example, a geometry pass with visibility resolution for each tile could be performed at the same stage as other per-tile operations. This may be beneficial in some embodiments, as it may allow for the relatively small number of primitives that need to be tracked for the tile to be cached in on-chip (GPU or CPU) memory.

Tiling the image may be accomplished in any of a number of ways. For example, frame buffer tiles may be generated by specialized tiling hardware (e.g., implemented as part of the GPU) configured for such a task. Alternatively, software executing on a CPU and/or GPU may be used if desired. Note that although tiling the image may provide certain benefits, in some embodiments, certain benefits may derive from performing the method even without tiling the image. For example, in some embodiments, performing depth filtering of volumes based on object groups depth ranges, for use in shading pixels intersecting a given object group, may be advantageous regardless of whether tiling is performed.

In 504, an initial list of volumes that intersect the tile at any depth range may be generated. The initial list of volumes may include one or more volumes. It may be typical, in some embodiments, that there may be multiple volumes in the initial list of volumes. The initial list of volumes may still be a subset of all of the volumes in the scene.

In some embodiments, the initial list of volumes for a tile may be generated at the same stage as tiling. For example, a hardware-based tiling device could be further configured to generate an initial volume list for each tile as the tiles are generated (e.g., similar to a geometry pass).

Alternatively, the initial list of volumes may be generated at another stage. For example, it may be desirable to compute the initial volume list in the same stage as other per-tile operations. In one set of embodiments, a special purpose compute shader may be invoked to generate an initial volume list for a tile just prior to rasterization of the tile. The initial volume list for the tile may then be used (e.g., as part of subsequently described steps of the method of FIG. 5) for shading pixels in that tile, and then discarded. This may reduce memory demands by not requiring simultaneous storage of volume lists for every single tile, as an initial volume list may only be needed for one tile at a time. Alternatively, a generic compute shader or software executing on the CPU may be used to generate the initial list of volumes.

In 506, a first depth range for a first set of objects that intersect the tile may be determined. The first depth range may be a range between the minimum depth and the maximum depth of the first set of objects. Alternatively, the first depth range may be a depth range of a subset of the first set of objects. For example, the first depth range might be the depth range between the minimum depth and the maximum depth of a subset of the first set of objects. In some embodiments, it may be desirable to limit the determined depth range to correspond to visible objects. This may be desirable in order to avoid performing additional computations because of objects which would be occluded by other objects in the scene and would not have any effect on pixels in the image.

The first set of objects may include one or more primitives (e.g., a primitive group), e.g., including one or more triangles (and/or other primitives). The first set of objects may have an overlapping or consecutive depth range. For example, the first set of objects might be a group of polygons representing a rock, a tree, a building, an animal, or some other object, group of objects, or portion of an object or group of objects. Although the term "set of objects", as used herein, may typically include one or more primitives (e.g., triangles), in some embodiments it may be possible for a "set of objects" to include only part of a primitive (e.g., part of a triangle). Thus the term "set of objects" may be used to refer to a grouping of scene geometry at any of a variety of granularity levels ranging from part of a single primitive to multiple primitives in a single primitive group to multiple primitive groups.

In 508, a first list of volumes that intersect the tile within the first depth range may be generated. The first list of volumes may be generated based on the initial list of volumes that intersect the tile at any depth range. This may be advantageous, as the initial list of volumes for the tile may already be filtered based on the height and width (X and Y) of the tile, and so may include a subset of the volumes in the scene which excludes volumes which do not affect the tile.

Generating the first list of volumes may include comparing the first depth range with depth ranges of volumes in the initial list of volumes. In some embodiments, volumes which are in the initial list of volumes which overlap in depth with the first depth range may be added to the first list of volumes. Since the initial list of volumes is limited to volumes which intersect the tile, such an approximate filtering method may give good results, although in some cases it may be possible that a volume which does not intersect the primitive group may be added to the first list of volumes.

For example, consider a case in which only a portion of a volume in the initial volume list intersects the tile, at a different depth range that does not overlap with the first depth range. In other words, the volume in question does not overlap (and should not affect) the first one or more objects. Despite this, if the depth range of the volume does overlap with the first depth range, albeit at a different area in X and Y, the volume may be added to the first list of volumes.

One way of avoiding this could be to record minimum and maximum depths of the portion(s) of a volume which intersect a tile when the initial list of volumes is generated. It will be recognized by those skilled in the art that while comparing such a depth range to the first depth range might be more accurate than utilizing the depth range of the full volume, it might also incur a greater cost (e.g., in terms of complexity, memory use, and/or computation time).

Another standard may be used in generating the first list of volumes if desired. For example, in some embodiments, a bounded volume (e.g., a box, for simplicity, or a volume shaped to more precisely match the shape of the primitive group, if desired) in X, Y, and Z may be generated, e.g., based on minimum and maximum dimensions of the primitive group in each direction, and compared with a bounding volume for each volume in the initial list of volumes to determine whether there is overlap between the primitive group and the volume. Such a technique may still have the potential for false positives (e.g., if an approximate bounding volume, such as a box, is used), but may represent a satisfactory medium providing best performance overall, at least in some embodiments.

In some embodiments, determining the first depth range and generating the first list of volumes may be performed as a 'per-primitive group' operation. If a primitive group spans multiple pixels (i.e., intersects multiple pixels) within a tile, the first list of volumes may be applicable to most or all of these pixels.

In 510, pixels in the tile may be shaded based on the first list of volumes. Shading a pixel based on the first list of volumes may include iterating over each volume in the first list of volumes to determine characteristics of the pixel based on effects of each volume on the pixel. For example, for an object which intersects the pixel, a loop over the first list of volumes may be run to evaluate and iteratively blend the effects of each volume in the first list of volumes on the object. The result (e.g., a color, or one or more color characteristics) may then be written to (e.g., blending with or overwriting the existing color) the frame buffer at that pixel's location. If the object intersects with multiple pixels, the result may be written to (e.g., again blending with or overwriting the existing color) the frame buffer at each of the affected pixels' locations.

It may be typical, in some embodiments, that the first set of objects may include multiple objects that intersect a given pixel. A similar process may thus be performed to iteratively blend effects of each volume in the first list of volumes on each of the multiple objects that intersect the pixel. In other words, shading a pixel based on the first list of volumes may be based on effects of each volume in the first list of volumes on each object in the first set of objects that intersects the pixel.

In 512, a second depth range for a second set of objects that intersect the tile may be determined. The second depth range may be a range between the minimum depth and the maximum depth of the second set of objects. Alternatively, the second depth range may be a depth range of a subset of the second set of objects. For example, the second depth range might be the depth range between the minimum depth and the maximum depth of a subset of the second set of objects, such as a subset comprising those of the second set of objects which are visible. The second set of objects may include one or more primitives (e.g., a primitive group), e.g., including one or more triangles. The second set of objects may have an overlapping or consecutive depth range. For example, the second set of objects may be a group of polygons representing a rock, a tree, a building, an animal, or some other object, group of objects, or portion of an object or group of objects.

The second set of objects may be different than the first set of objects. The second set of objects and the first set of objects may have non-overlapping (discontinuous) depth ranges relative to each other. For example, the second set of objects might represent a tree (or a portion thereof) in the foreground of a scene, while the first set of objects might represent a hill (or a portion thereof) in the background of a scene. Thus, there may be a significant depth range between the first set of objects and the second set of objects in which no objects intersect the tile in question. For this reason, it may be desirable to treat them as different sets of objects with respect to application of volumes. For example, this may avoid the unnecessary work which might be involved in attempting to apply volumes whose area of influence is limited to a depth range beyond that of the second set of objects and before that of the first set of objects to either of the first or second set of objects.

It should be noted that in some embodiments, while the first and second sets of objects (and/or any number of other sets of objects) may have non-overlapping depth ranges, any number of other sets of objects may have overlapping (continuous) depth ranges. For example, in some embodiments, sets of objects may be differentiated based on factors other than depth ranges, and so in some cases different sets of objects may have overlapping depth ranges while other different sets of objects may have non-overlapping depth ranges. As one example, primitive groups, or groups of primitives having the same state, may be used to differentiate sets of objects in some embodiments.

In 514, a second list of volumes that intersect the tile within the second depth range may be generated. The second list of volumes may be generated based on the initial list of volumes that intersect the tile at any depth range. The second list of volumes may be generated in a similar manner as the first list of volumes. For example, generating the second list of volumes may include comparing the second depth range with depth ranges of volumes in the initial list of volumes. Volumes which are in the initial list of volumes which overlap in depth with the second depth range may be added to the second list of volumes. Alternative means of generating the second list of volumes, including means similar to the alternative means described above for generating the first list of volumes, may also or alternatively be used.

In 516, pixels in the tile may be shaded based on the second list of volumes. Similar to shading a pixel based on the first list of volumes, shading a pixel based on the second list of volumes may include iterating over each volume in the second list of volumes to determine characteristics of the pixel based on effects of each volume on the pixel.

In 518, each shaded pixel may be stored in a frame buffer. Storing each shaded pixel in the frame buffer may include storing information identifying the determined characteristics of the pixel in the frame buffer. In some embodiments, storing each shaded pixel in the frame buffer may be an iterative process. For example, in some embodiments, pixel data may be stored after shading pixels based on the first list of volumes and the first set of objects, and again after shading pixels based on the second list of volumes and the second set of objects. Thus, if multiple sets of objects intersect a pixel (e.g., an object which intersects the pixel is partially transparent and/or does not completely obscure another object which intersects the pixel), the effects (e.g., on color characteristics) of each relevant object on the pixel may be calculated on a per-object basis and blended into any existing characteristics (e.g., which may have been previously calculated based on other objects which intersect the pixel) of the pixel.

A case in which multiple objects intersect a pixel and are visible may occur as a result of multiple objects in a single set of objects intersecting the pixel and/or as a result of multiple objects in different sets of objects intersecting the pixel. Thus, in some embodiments, a pixel might be shaded partially based on the first list of volumes, and also partially based on the second list of volumes. For example, if one or more objects in each of the first set of objects and the second set of objects intersects the pixel, and the foremost object(s) do not entirely obscure the object(s) behind them in the scene (e.g., the foremost object(s) are not entirely opaque/are partially transparent), it may be appropriate to blend the effects (e.g., on color or other pixel characteristics) of both the first list of volumes and the second list of volumes on a pixel.

Consider an exemplary embodiment in which a scene includes a pixel which is intersected in the background by a rock (comprising a first object/primitive group) and in the foreground by a glass pane (comprising a second object/ primitive group). Consider further that the pixel may initially be shaded based on primitives representing the rock that intersect the pixel. At a subsequent time, then, the pixel may additionally be shaded based on primitives representing the glass pane that intersect the pixel. Because the second object (the glass pane) may be partially transparent, the result of shading the pixel based on the second object and its corresponding second list of volumes may be blended into the result of shading the pixel based on the first object and its corresponding first list of volumes.

In contrast, consider an exemplary embodiment in which the second set of objects represents a brick wall, which is opaque. In this case, the first object (the rock) would be obscured, and the pixel values stored as a result of shading the pixel based on the first object might be overwritten by the result of shading the pixel based on the second set of objects. It should be noted, however, that in some embodiments an initial geometry pass (or other visibility filtering operation) such as previously described may be utilized to ensure that shading of a pixel based on objects which intersect the pixel but are obscured is not performed. For example, in this exemplary embodiment, this a visibility filtering operation might indicate that the first object is obscured and may be discarded from a list of primitive groups intersecting the tile (or pixel), so only the second set of objects may be used to shade the pixel.

It is further worth contrasting the difference between the above-described method for tiled forward shading with improved depth filtering to a method which does not utilize improved depth filtering, particularly in a scene with significant depth complexity. In particular, consider a scene in which numerous tiles include depth discontinuities. For example, it might be desirable to render a landscape scene in which a hill is present at a farther depth range and a tree is present at a nearer depth range, with a significant distance between the farthest depth range of the tree and the nearest depth range of the hill. The hill may be partially obscured by various branches and twigs of the tree, meaning numerous tiles may include a number of pixels for which only the tree is visible, a number of pixels for which only the hill is visible, and possibly a number of pixels for which the hill is visible but partially obscured by the tree (e.g., by a partially transparent leaf).

Without the improved depth filtering described herein, all volumes that intersect such a tile, at least from the minimum depth of the tree to the maximum depth of the hill, might be considered in shading all of the pixels in that tile. Thus, a great deal of computational expense might be wasted searching volumes that are far removed from the tree for effects on the tree, and further computational expense may be expended searching volumes that are far removed from the hill for effects on the hill.

In contrast, by generating a list of volumes relevant to the depth range of the hill and iterating only over those volumes in shading pixels intersecting the hill, and independently generating a list of volumes relevant to the depth range of the tree and iterating only over those volumes in shading pixels intersecting the tree, a tremendous amount of computation may be saved.

It should further be noted that while the above method primarily describes a set of embodiments in which a tile intersects two sets of objects, additional embodiments in which a tile may intersect any number of sets of objects are also possible and may be common. Thus, according to some embodiments, the method may include iterating over one or more of the steps described above as being performed for each of the first and second sets of objects for each of any number of additional sets of objects that intersect the tile.

Exemplary Implementation Details

The following description is illustrative of one possible set of implementation details. It is provided by way of example and is not intended to be limiting to the disclosure as a whole.

In some embodiments, a user who is programming an application programming interface (API) (e.g., of a graphics application) to interact with the tiled forward rendering system described herein may submit scene geometry and volumes (e.g., lighting) independently, in a way very similar to a deferred shading system. The tiled forward rendering system may include hardware tiling functionality to determine which geometry intersects which frame buffer tile. The system may also include functionality for generating each initial list of volumes (e.g., lights) that intersect a tile. According to various implementations, this may be performed in software on the CPU, using a hardware tiling device (much like may be used for normal geometry), a generic compute shader, or a special purpose compute shader invocation (e.g., which computes the volume list for one tile, and is run immediately before that tile is rasterized). Use of the special purpose compute shader invocation may reduce memory demands by not having to simultaneously store volume lists for every single tile.

Once the initial list of volumes has been generated per-tile, a program (the "state update program") may be run per-tile, per-primitive-group (a set of primitives sharing the same state). In some embodiments, the inputs to this program may include: the minimum and maximum depth of the primitive group; which frame buffer tile is being rendered; and the width/height of a frame buffer tile.

With this information, the state update program may generate a bounding box in X,Y,Z for the primitive group, and compare that against a bounding volume for each volume in the initial (per-tile) list (recall the per-tile list may already be filtered in X and Y and so may be relatively short). One particularly efficient way to accomplish this could include the state program running multiple SIMD (single instruction, multiple data) instances, although it could be accomplished using a single SIMD instance if desired (e.g., if hardware doesn't provide this capability).

If the system hardware (e.g., the GPU) does allow a state program to fill all instances in a slot, this filtering could be accomplished x times faster by checking x bounding boxes in parallel (e.g., where the value of x depends on the hardware capability). When a primitive group/volume intersection is found, the state program may append the volume's description into an array in a common store (e.g., on-chip and/or in a cache memory). If the allocated common store space is filled, it may be possible to use dynamically allocated array in memory, though such circumstances may be relatively uncommon.

Once all intersections between the primitive group and the volumes in the per-tile list of volumes have been found and stored (effectively generating a shorter, depth filtered list of volumes), the pixel shader instances for this primitive group may be invoked. During this forward rendering pass, the individual pixel shaders may iterate over that list of volumes and apply them.

In some embodiments, there may also be a switch statement in the pixel shader to select the right body of code to apply different types of volumes (e.g., diffuse lights vs. specular lights, etc.). It should be noted, though that the iteration over each volume may be made more efficient by eliminating both the loop and switch statement. For example, the state program may be able to determine what code is best to apply each type of volume to each type of surface material (and may have knowledge of both of these), and may thus be able to encode a direct function pointer to that code in the common store alongside the volume properties. The final volume's function pointer may be configured to jump to the pixel shader epilogue. No instructions may be needed for comparisons: only unconditional jumps may be performed to iterate over N volumes.

Hardware Considerations

Many of the advantages of the method described herein may be even more pronounced if certain hardware configuration considerations are taken into account. Note that although these considerations may help to build upon the inherent advantages of the method, they may not all be necessary to gain benefits from use of the method. Some of these considerations have been noted above, but are noted again here for completeness.

Some GPU designs may include hardware features for loading shader constants. One example of this is a programmable device which can issue direct memory access (DMA) operations from memory into a 'shared' register bank, in which constants such as volume descriptions may be stored, e.g., for use in shading. A state update program may typically issue a single DMA from a constant address. If a primitive spans multiple tiles, the state update program may be run 'redundantly', as the second time a primitive is seen (e.g., in a new tile), an additional DMA may be performed to re-load its constants into the shared registers.

In some embodiments, the state update program may be used in combination with the hardware (e.g., GPU) of a system to generate volume lists, per-primitive group, which are filtered by depth. Such a state update program may need to be told the minimum and maximum depth of any pixel in a primitive group, so that the correct set of volumes in depth can be extracted.

It may also be desirable for the state update program to be able to run multiple instances, rather than just one instance. When searching the per-tile volume list to generate the per-tile/per-primitive-group volume list, one instance may be functional, as it could loop over the entire per-tile list. But, it may be much more efficient to do so in parallel. Many GPU designs include broad parallel processing capability, and so if a GPU's full tasking capability (e.g., 16-wide, 32-wide, or some other tasking capability) could be used, a parallel search could be performed quite rapidly. This may also require a (preferably inexpensive) way for each slot to atomically add an entry to the shared volume list (e.g., OpenCL local memory atomics).

It may also be desirable, in some embodiments, to provide a tiling engine that can tile multiple streams of data. For example, a hardware tiling engine that could tile one geometry list, one light list, one decal list, etc., could be used.

Other Notes

If the per-tile/per-primitive group volume list is unusually large, it may be desirable to support keeping as many volumes as possible cached in the shared register bank, and falling back to an array in memory for the rest. In this case, a mechanism may need to be provided to allocate and deallocate that memory as the list. It should be noted that it may be possible, though generally unlikely and uncommon, that a 'fully filtered' list might contain every volume in the scene.

Reference is generally made herein to the use of volumes in a scene. In many scenes, the most common and numerous type of volume used may be a light. In some embodiments, the initial, first, and second lists of volumes may exclusively include lights, while other types of volumes may not exist in the scene or may be treated in a different manner. However, in some embodiments, the initial, first, and second lists of volumes may include both lights and other types of volumes, or may only include other types of volumes.

As one example, applying decals may be very similar to applying lights in some embodiments, and both may be included in a list of volumes. Thus, the geometry's normal might be computed, a set of decal volumes might further modify the normal, and then a set of light volumes might modify the color (taking into account the modified normal). Decals may often involve textures, and so each decal volume may have its own texture in some embodiments. Some hardware configurations may support this naturally; for example, texture state may be encoded in the common store, such that each iteration over a loop of decals may sample from a different texture, if desired.

An alternative way of generating per-tile light (or, more generally, volume) lists may be used in some embodiments, if desired. One such way may include only lights that intersect visible geometry. In this case, light depth/volume culling may be performed using hardware depth/stencil testing. This may be analogous to the way light volumes are drawn in deferred shading, except that fragments determined to be inside the volume may trigger the state program to add the corresponding light to the tile's list for later, rather than being used immediately and performing shading for that light. This may require that the depth buffer be seeded with the depth of all opaque objects, either via a Z-only pass or the ability to shade out-of-order relative to draw order. Standard light volume tests (e.g., a la Carmack's Reverse) may be used for shading opaque objects, but transparency may only test that the front face of the volume is in front of the Z value in the depth buffer (e.g., to exclude lights occluded by what has already been drawn). For shading of opaque objects, this may provide tight bounds for culling, and may take advantage of GPU architectures with high Z/stencil fillrate.

It should also be noted that aspects of the method described herein may also be extended to non-tile-based renderers as well, if desired. In the case of a streaming renderer, the over-shading advantages may be lost (e.g., if relying on EarlyZ tests, which may only be partially effective). However, a streaming renderer may still be able to run a state update program multiple times for a single triangle, e.g., if that triangle covers large areas of the framebuffer.

Advantages of the Method

The following section describes and re-iterates some of the advantages of the method for tiled forward shading with improved depth filtering described herein, including references back to the discussion of issues relating to forward and deferred shading, and explanation of how the method described herein performs with respect to those issues.

Overall, the method may allow the application programmer to write their shaders as if submitting them to a forward renderer (loop over N volumes, where the volumes are loaded as shader constants). But, they may submit draw batches and volumes to the GPU as if it was a deferred renderer. Thus, they may not need to issue a separate draw batch with a CPU prepared set of shader constants for each object/volume intersection. Instead, the state update program may cause pixel shader instances from the same draw batch to execute with different sets of shader constants, depending on which frame buffer tile and the depth that the primitive group falls in.

The issue of shader permutations may be resolved using the present method, as the application programmer may be able to write a single shader to handle all cases.

Potential problems relating to over shading may be resolved using the present method by using hardware-based or other visibility filtering in combination with the method, although this may not be necessary to gain many of the other benefits of improved depth filtering.

CPU performance in the present method may equal the advantage of Deferred Shading, as geometry and volumes can be submitted independently, allowing very aggressive batching and instancing.

The issue of the size of the G-Buffer size is resolved in the present method because no G-Buffer may be required. The full set of shader registers may be available to pass data to the volume loop.

Anti-aliasing concerns are resolved in the present method because, again, there is no G-Buffer, and the memory usage penalty of MSAA may thus be the same as a forward renderer. In addition, the reduced memory bandwidth usage resulting from not using a G-Buffer is a further advantage.

The transparency concerns of deferred shading may be resolved in the present method, because all shading may be done in the forward pass, and so its transparency capabilities are the same as forward rendering.

Material variety is well-provided for in the present method. Shading is done in the forward pass, so the application programmer may have a full ability to provide arbitrary code to handle the intersection of each volume type and material type, but without having to pay the cost of per-pixel comparison instructions to select the correct code at runtime.

Greater software simplicity may be possible using the present method than with either forward or deferred, as an application programmer may be able to write a 100% deferred design, and have their 'deferred' shading apply to transparencies too (e.g., instead of maintaining both forward and deferred renderers in parallel).

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method for rendering a three-dimensional scene as a two-dimensional image, wherein the three-dimensional scene comprises a plurality of objects and a plurality of volumes, wherein the two-dimensional image comprises a plurality of pixels, the method comprising:
   dividing the image into a plurality of tiles, wherein each tile comprises a subset of the plurality of pixels;
   for each respective tile:
      determining a first depth range for a first set of objects that intersect the tile based on a nearest object in the first set of objects and a furthest object in the first set of objects;
      generating a first list of volumes, wherein the first list of volumes comprises a subset of the plurality of volumes that intersect the tile and that have a depth range that intersects the first depth range, based on comparison of the first depth range and depth ranges of volumes in the plurality of volumes;
      subsequent to generating the first list of volumes, shading pixels in the tile based on the first set of objects, wherein the shading is performed using volumes in the first list of volumes and not using other volumes in the plurality of volumes; and
      storing shaded pixels in a frame buffer.

2. The method of claim 1, further comprising:
   determining a second depth range for a second set of objects that intersect the tile;
   generating a second list of volumes, wherein the second list of volumes comprises a subset of the plurality of volumes that intersect the tile and that have a depth range that overlaps with the second depth range; and
   shading pixels in the tile based on the second list of volumes.

3. The method of claim 2, wherein the first depth range and the second depth range are discontinuous.

4. The method of claim 1, wherein shading a pixel using the first list of volumes comprises iterating over each volume in the first list of volumes to determine characteristics of the pixel based on effects of each volume on the pixel.

5. The method of claim 4, wherein storing each shaded pixel in the frame buffer comprises storing information identifying the determined characteristics of the pixel in the frame buffer.

6. The method of claim 4,
wherein storing each shaded pixel in the frame buffer further comprises blending the characteristics of the pixel determined based on effects of each volume in the first list of volumes on the pixel with previously determined characteristics of the pixel.

7. The method of claim 1, wherein shading a pixel using the first list of volumes is based on effects of each volume in the first list of volumes on one or more objects that intersect the pixel.

8. The method of claim 1, further comprising, for each respective tile:
generating an initial list of volumes that intersect the tile;
wherein generating the first list of volumes comprises selecting volumes that intersect the first depth range from the initial list of volumes that intersect the tile.

9. The method of claim 1, wherein the plurality of volumes comprise a plurality of lights.

10. A computer system configured to render a three-dimensional scene as a two-dimensional image, wherein the three-dimensional scene comprises a plurality of objects and a plurality of volumes, wherein the two-dimensional image comprises a plurality of pixels, the computer system comprising:
a central processing unit (CPU);
a graphics processing unit (GPU); and
a non-transitory memory medium, wherein the non-transitory memory medium comprises program instructions executable by the CPU and/or the GPU to:
divide the image into a plurality of tiles, wherein each tile comprises a subset of the plurality of pixels;
for each respective tile:
generate an initial list of volumes that intersect the tile;
for one or more sets of objects that intersect the tile:
determine a depth range for the set of objects based on a smallest depth of an object in the set of objects and a greatest depth of an object in the set of objects;
generate a list of volumes for the set of objects based on the initial list of volumes, wherein the list of volumes is a subset of the initial list of volumes, wherein volumes in the list of volumes intersect the tile and the depth range for the set of objects;
shade, after generating the list of volumes, pixels that intersect the set of objects based on the set of objects, wherein the shading the pixels based on the set of objects uses only volumes that are in the list of volumes; and
store each shaded pixel in a frame buffer.

11. The computer system of claim 10, wherein generating the list of volumes for each of the one or more sets of objects comprises comparing bounds of each volume in the initial list of volumes that intersect the tile with a bounding volume of the respective set of objects, wherein the list of volumes for each respective set of objects comprises volumes whose bounds intersect the bounding volume of the respective set of objects.

12. The computer system of claim 11, wherein the program instructions are executable to perform a hardware call to the GPU to generate the list of volumes for each of the one or more sets of objects, wherein in response to the hardware call the GPU is configured to compare bounds of a plurality of volumes with the bounding volume of the respective set of objects simultaneously.

13. The computer system of claim 10, wherein the GPU comprises hardware configured to divide the image into the plurality of tiles and generate the initial list of volumes that intersect the tile for each respective tile.

14. A non-transitory computer-accessible memory medium comprising program instructions for generating a two-dimensional image of a three-dimensional scene, wherein the program instructions are executable by a CPU and/or a GPU to:
divide the image into a plurality of tiles, wherein each tile comprises a subset of the image, wherein each tile comprises a plurality of pixels;
for each respective tile:
determine a first depth range for a first set of objects that intersect the tile;
generate a first list of volumes, wherein the first list of volumes comprises a subset of a plurality of volumes in the scene, wherein volumes in the subset intersect the tile and that overlap with the first depth range; and
subsequent to generating the first list of volumes, shade pixels in the tile based on the first set of objects, wherein the shading is performed using volumes in the first list of volumes and not using other volumes in the plurality of volumes.

15. The memory medium of claim 14, wherein in order to shade the pixels which intersect the first set of objects based on the first list of volumes, the program instructions are further executable to:
calculate effects of volumes in the first list of volumes on objects in the first set of objects to generate characteristics of pixels intersecting objects in the first set of objects.

16. The memory medium of claim 15, wherein the program instructions are further executable to:
write pixel data to a frame buffer based on the generated characteristics of pixels intersecting objects in the first set of objects.

17. The memory medium of claim 16, wherein writing pixel data to the frame buffer comprises blending the generated characteristics of pixels with previously determined characteristics of the pixels.

18. The memory medium of claim 16, wherein writing pixel data to the frame buffer comprises overwriting previously determined characteristics of the pixels with the generated characteristics of pixels.

19. The memory medium of claim 14, wherein the program instructions are further executable to, for each of a plurality of additional sets of objects that intersect the tile:
determine a respective depth range of the respective set of objects that intersect the tile;
generate a respective list of volumes that intersect the tile within the determined depth range of the respective set of objects; and
shade pixels which intersect the respective set of objects based on the set of objects, using only the respective list of volumes.

20. The memory medium of claim 14, wherein the first list of volumes comprise a plurality of lights and/or a plurality of decals.

21. A computer-implemented method for rendering a three-dimensional scene as a two-dimensional image, wherein the three-dimensional scene comprises a plurality of objects lit by a plurality of lights wherein the two-dimensional image comprises a plurality of pixels, the method comprising:
- dividing the image into a plurality of tiles, wherein each tile comprises a subset of the plurality of pixels;
- for each respective tile:
  - generating a list of primitive groups that intersect the tile;
  - generating an initial list of lights that intersect the tile;
  - for one or more primitive groups in the list of primitive groups that intersect the tile:
    - determining a depth range of the primitive group based on a smallest depth of a primitive in the primitive group and a greatest depth of a primitive in the primitive group;
    - generating a per-primitive-group list of lights that includes one or more, but less than an entirety of the initial list of lights, wherein the generating includes comparing the depth range with depth ranges of lights in the initial list of lights and selecting lights whose depth range overlaps with the depth range of the primitive group; and
    - shading, after generating the per primitive-group list of lights, pixels in the tile which intersect the primitive group using only lights in the per-primitive-group list of lights to shade the pixels based on the primitive group.

22. The computer-implemented method of claim 21, wherein generating the per-primitive group list of lights comprises comparing bounding volumes of lights in the initial list of lights that intersect the tile with a primitive group bounding volume whose dimensions are based on minimum and maximum height, width, and depth dimensions of the primitive group, wherein the per-primitive group list of lights comprises lights whose bounding volumes intersect the primitive group bounding volume.

23. The computer-implemented method of claim 21, wherein the list of primitive groups that intersect the tile comprises a subset of all the primitive groups that intersect the tile, wherein the subset excludes primitive groups which are obscured.

24. The computer-implemented method of claim 21, wherein shading the pixels in the tile which intersect the primitive group comprises:
- generating pixel data based on characteristics of and interactions between primitives in the primitive group and lights in the per-primitive group list of lights; and
- storing the pixel data in a frame buffer.

25. A computer-implemented method for rendering a three-dimensional scene as a two-dimensional image, wherein the three-dimensional scene comprises a plurality of objects and a plurality of volumes, wherein the two dimensional image comprises a plurality of pixels for which pixel data is stored in a frame buffer, the method comprising, for each of a plurality of sets of objects:
- determining a bounding box for the set of objects based on minimum and maximum dimensions in height, width, and depth of the set of objects;
- comparing volume bounds of at least a subset of the plurality of volumes with the bounding box for the set of objects;
- generating a list of volumes that intersect the bounding box for the set of objects based on said comparing; and
- subsequent to the generating, for each pixel intersecting the set of objects:
  - calculating effects of each volume in the list of volumes on the pixel and not calculating effects of volumes that are not in the list of volumes;
  - blending the calculated effects with pixel data for the pixel to generate new pixel data for the pixel; and
  - storing the new pixel data in the frame buffer.

* * * * *